Patented Dec. 4, 1951

2,576,945

UNITED STATES PATENT OFFICE 2,576,945

PLASTIC RUBBER COMPOSITIONS

Walter C. Klingel, Basking Ridge, N. J.

No Drawing. Application December 20, 1945,
Serial No. 636,282

4 Claims. (Cl. 154—139)

The present invention relates to a method for the plasticizing of synthetic rubbers and various resinous plastic compositions, including thermosetting plastics and thermoplastic resins, and admixtures thereof with natural rubber, and to the resulting resin and rubber compositions. More particularly, the invention relates to a method of treatment of synthetic rubber and plastic resinous compounds and the products thereof by which the tackiness and other desired properties of the compositions or admixtures thereof with natural rubber may be improved or modified to improve the working properties of the compositions prior to the curing or vulcanization or setting reactions, such as to permit the formation of laminations therefrom or to cause adherence to or impregnation of fabric, leather, or other sheets or sheet material, so as to form a laminated product of such a character as to permit flexing and extensive frictional contact without causing separation of the laminations or other deterioration of the product.

The present invention is based on the discovery that guaiac resin, and gum-containing compositions containing the same or derived from the gum or resin of the wood of *Guajacum officinale*, Linné, or *Guajacum sanctum* Linné (Fam. Zygophyllaceae), when incorporated into synthetic rubber, or resins of the synthetic rubber type, or into thermosetting or themoplastic resins, or admixtures thereof with natural rubber, or compounds thereof, acts as a chemical peptizing agent during mastication, and assists also to level out the lot to lot variations in synthetic types of rubber with a reduction in the breakdown period and produces smoother processing of the compositions with less heat development. In the use of guaiac resin in synthetic rubber admixtures, and in thermosetting and themoplastic resin compositions requiring mastication prior to curing, vulcanization, or the setting reaction, a lower minimum processing temperature is produced, and in extrusion operations there is a more rapid and better extrusion with less swell and without any deleterious effect on the hardness or other desired properties of the final reaction product.

One of the objects of the invention is to provide a method of improving the processing of rubber, synthetic rubber and plastics to increase the tackiness to such an extent as to permit laminating layers of the composition.

Another object of the invention is to provide a method for the processing of rubber, synthetic rubber and resinous plastics so as to permit the formation of sheets which after drying may be pressed together to obtain a good bond between them.

Another object of the invention is to provide synthetic rubber and resin plastic compositions which will have high adhesion to fabric, leather and other surfaces so that after the composition has been cured it will have substantially the same resistance to flexing and wear as in the case of natural cured rubber compositions, as in rubber tires, for example.

With these and other objects in view, the invention comprises the various compositions and combination of method steps hereinafter set forth and more particularly defined in the claims.

It is well known that polybutadienes, polyisoprene, copolymers of butadiene and methacrylic nitrile, copolymers of butadiene and styrene, vinyl naphthalene, methyl methacrylate, interpolymers of butadiene with acrylic acid and other similar resinous plastic materials have little or no tackiness, and hence do not adhere to fabric, leather and other surfaces. It is accordingly difficult or substantially impossible to form laminated layers of such products.

In accordance with the present invention, good adhesion may be obtained by applying to the surface of such interpolymers or resinous plastic materials, a coating of guaiac resin dissolved in a suitable solvent, such as methyl ethyl ketone, which is preferably employed, or other solvents such as acetone, methyl alcohol, ethyl alcohol, isopropyl alcohol, isobutyl alcohol, ether, creosote, ethylene dichloride and chloroform, and admixtures thereof.

As an example of the method of carrying out my invention, I may employ 10 parts of guaiac resin in 50 parts of methyl ethyl ketone which may be applied over the surface of a sheet of an interpolymer such as polybutadiene. A number of such coated sheets are formed and allowed to dry and are then pressed together by manual or mechanical means, such as by the use of a hand roller, or by means of a press by which the laminations are bonded together.

As another example of the use of the invention, a solution of 10 parts of guaiac resin in 50 parts of isobutyl alcohol may be applied to a fabric by immersing sheets of the fabric in the guaiac resin solution. A synthetic rubber, such as "neoprene," is then plasticized by incorporating therein about 1 to 3 percent of guaiac resin and is masticated in any desired form of masticating equipment. The fabric sheets are then each treated and impregnated with the plasticized "neoprene" composition containing the guaiac resin. The surface of the impregnated fabric sheets may then be coated with the solution of guaiac resin in isopropyl alcohol and the sheets are then allowed to dry. The sheets are then pressed together and the rubber composition is then cured or vulcanized under heat and pressure in the usual way to obtain a cured product.

It will be obvious that this general method may be employed in the making of synthetic rubber tires and the bonding is such that very little internal friction is developed during the use of the tires, and under operating conditions on a vehicle, the temperature of the tires remains low and relatively the same high resistance to wear is obtained as in tires in which only natural rubber has been employed.

The guaiac resin plasticizing agent may also be used if desired with resinous materials, such as polyisoprene, and other resinous materials above referred to, by incorporating from 1 to 10 percent of the guaiac resin during the mastication process. The guaiac resin plasticizing agent may also be employed, if desired, in the making of rubber articles composed partly of synthetic rubber and partly of natural rubber, such as 50 percent of natural rubber with 50 percent of synthetic rubber, such as isoprene, the guaiac resin being employed to the extent of 1 to 10 percent, based on the rubber content, the amount used depending to some extent on the type of masticating equipment employed, and on the particular properties of the final product to be obtained. It will be understood that in determining the optimum content of the guaiac resin to be used under given conditions, test samples may be used with varying percentages of the guaiac resin plasticizing agent to determine the end result of particular percentages of the plasticizing agent with other proportions of the ingredients remaining constant, and to determine the exact percentage of the plasticizing agent to be employed in order to obtain the desired specific properties in the final product.

It will be understood that the addition of a relatively small amount of guaiac resin improves the adhesive power of natural and synthetic rubber cements, and cements having a chlorinated rubber base, the proportion of the guaiac resin employed being preferably between 1 to 10 percent, based on the rubber content, the exact percentage employed being dependent on the end results to be obtained, and other factors as will be fully understood by those skilled in the art. The guaiac resin plasticizing agent may be added to natural rubber with improved results, or to reclaimed rubber dispersions without producing coagulation in admixtures such as are ordinarily used. Latex or artificial dispersions may be shipped in admixture with guaiac resin without producing coagulation when admixed therewith in proportions of from 1 to 10 percent of guaiac resin, based on the weight of the rubber in the latex or rubber dispersion.

In the use of guaiac resin in connection with thermosetting and thermoplastic resins, a proportion of from 1 to 10 percent of guaiac resin has been found to facilitate the processing of the resins, particularly in the molding and extrusion of compositions of hard thermosetting or thermoplastic resins having a Shore hardness ranging from 70 to 100.

When the guaiac resin is to be incorporated in synthetic rubber compounds during mastication, it is unnecessary to dissolve the guaiac resin in a solvent, but may be added directly in powdered form to the rubber compound, or combined with a standard plasticizer or softener to form a viscous liquid which may then be added to the rubber compound during mastication. The guaiac resin may be combined with a plasticizer or softener such as Methyl Cellosolve Acetyl Ricinoleate, or diethylene glycol dipropionate, or tricresyl phosphate, or dibutyl phthalate, or pine tar, or other coal tar liquid resins as are commonly used in the compounding of synthetic rubber.

*Example 1*

As an example of the use of guaiac resin, it may be stated that 60 parts by weight of guaiac resin may be added in powdered form to 30 parts by weight of Methyl Cellosolve Acetyl Ricinoleate which may be heated to about 80° C., the guaiac resin being added slowly with continual stirring. The resulting mixture when cooled has about the consistency of soft tar or putty. This guaiac resin solution may then be combined with the other ingredients as follows, the proportions being given in parts by weight:

| | |
|---|---|
| "Perbunan 26" (emulsion copolymer of butadiene and acrylonitrile) | 100.00 |
| "MPC black" (medium processing channel black) | 37.1 |
| Magnesium carbonate | 22.9 |
| Zinc oxide | 5.0 |
| Blended wax | 3.0 |
| Tetramethylthiuram-monosulfide accelerator | 0.15 |
| Tetramethylthiuram-disulfide | 0.15 |
| Sulfur | 1.2 |
| Guaiac resin | 10.00 |

Instead of adding the guaiac resin in the form of a solution in the above composition, it may be added and admixed in powder form, the amount to be added depending upon conditions and the product to be obtained, but in general being added in the amount of from 1 to 10 parts by weight. After complete admixture, the composition may be cured in about 50 minutes at a temperature of about 280° F.

*Example 2*

As another example of the use of guaiac resin, this material may be added to a synthetic rubber in about the following proportions:

| | |
|---|---|
| "Hycar OR-25" | 100.00 |
| Zinc oxide | 5.00 |
| Stearic acid | 1.00 |
| Sulfur | 1.50 |
| SFR black (Semi-reenforcing furnace black) | 60.00 |
| Benzothiazyl-disulfide | 1.50 |
| Guaiac resin | 10.00 |

In this composition the guaiac resin may be added in powdered form during mastication and the product may be cured in 30 minutes at a temperature of about 310° F., for example.

*Example 3*

In the use of guaiac resin in conjunction with rubber cements for general purposes, the following compositions may first be made up, the ingredients being designated in parts by weight:

| | Part A | Part B |
|---|---|---|
| | Gms. | Gms. |
| "Hycar OR-15" | 100.00 | 100.00 |
| Channel black | 50.00 | 50.00 |
| Zinc oxide | 5.00 | 5.00 |
| Aldol-alpha-naphthylamine | 5.00 | 5.00 |
| "Nevoll" (Dispersing agent for compounding rubber) | 25.00 | 25.00 |
| Sulfur | 6.00 | |
| Mercaptobenzothiazole | | 6.00 |
| Guaiac Resin | 10.00 | 10.00 |

Parts "A" and "B" are then combined by dissolving about 850 parts by weight of "part A" in ethylene dichloride and making up to 1 gallon with the same solvent, after which 850 parts by weight of "part B" is then dissolved in ethylene dichloride and made up to 1 gallon with the same solvent, which are then combined by thoroughly mixing equal volumes of the solutions just prior to use and adding 1 part by weight of butyraldehyde-aniline condensation product for each pint of the cement.

Example 4

In the use of the guaiac resin with a chlorinated rubber cement, the following proportions and procedure may be given by way of example:

|  | Part A | Part B |
|---|---|---|
|  | Gms. | Gms. |
| "Hycar OR-15" | 100.00 | 100.00 |
| Channel black | 50.00 | 50.00 |
| Zinc oxide | 5.00 | 5.00 |
| "Age-rite Resin D" (Polymerized trimethyldihydroquinoline) | 5.00 | 5.00 |
| Coal tar | 15.00 | 15.00 |
| Sulfur | 5.00 |  |
| Mercaptobenzothiazole |  | 5.00 |
| Guaiac Resin | 10.00 | 10.00 |

The parts "A" and "B" are then combined by first dissolving about 500 grams of "part A" in ethylene dichloride and making it up to 1 gallon, and then dissolving 500 grams of "part B" in ethylene dichloride and making it up to 1 gallon with the solvent, after which 25 parts by volume of "part A" are mixed with 25 parts by volume of "part B" and 50 parts by volume of a chlorinated rubber solution made by dissolving 12 parts of chlorinated rubber (130 centipoise) in 88 parts of "Solvesso #1" (by weight). The material, "Solvesso #1" is a solvent made by the Standard Oil Company of N. J. and comprises highly aromatic hydrocarbons having a specific gravity of 0.835. This material has an initial boiling point of about 210° F. and a final boiling point of about 275° F. when 95% of a 100 c. c. sample has distilled. Just prior to using, 1 gram of butyraldehyde-aniline condensation product is added for each pint of combined ingredients.

In the use of the guaiac resin in connection with chlorinated rubber, the resin may also be directly incorporated into chlorinated rubber solutions instead of being incorporated into the "part A" and "part B" as above set forth.

Example 5

As an example of the use of guaiac resin with a polyvinyl chloride the following proportions by weight may be used:

| | |
|---|---|
| "Geon Resin 101" or "Geon Resin 102" (polyvinyl chloride resin) | 100.00 |
| "Stabilizer MB" | 12.00 |
| Dibutyl phthalate | 35.00 |
| "Hycar OR-15" | 100.00 |
| Stearic acid | 1.00 |
| Litharge | 5.00 |
| Sulfur | 1.50 |
| Mercaptobenzothiazole | 2.50 |
| "FT black" (Fine thermal black) | 100.00 |
| Wool grease | 1.00 |
| Guaiac resin | 10.00 |

This composition may be cured, for example, in about 30 minutes at a temperature of about 320° F. The material above designated by the trade name "Stabilizer M. B." is made by the B. F. Goodrich Chemical Company of Akron, Ohio, and is a plasticizer containing lead silicate. This material is not a part of this invention and any suitable plasticizer may be used in place of "Stabilizer M. B." in the above example. The term "FT black" is a carbon black obtainable on the market under this trade name designating "Fine thermal black" which is the material preferred for use in the above example, but it will be understood that any fine carbon black may be used in the proportion indicated.

Example 6

As an example of the use of guaiac resin for the plasticizing of a thermoplastic material, the guaiac resin may be incorporated with rock hard thermoplastic tubing stock in the following proportions by weight:

| | |
|---|---|
| "Vinylite Resin VYNW" | 100.00 |
| Charcoal (90 mesh) | 100.00 |
| Methyl cellosolve acetyl ricinoleate | 20.00 |
| Guaiac resin | 10.00 |

In the above example, the material designated by the trade name "Vinylite Resin VYNW" is copolymerized vinyl chloride and vinyl acetate, which is obtainable on the market and is manufactured by Carbide and Carbon Chemicals Corporation. The letters "VYNW" designate a grade mark and any copolymerized vinyl chloride and vinyl acetate may be used in the proportion indicated in the above example.

It is well known that the term "Hycar" is a trade name referring to a plastic composition composed mainly of a copolymer of butadiene and acrylonitrile, and is manufactured by the Hycar Chemical Company of Akron, Ohio. The letters "O. R." in the name indicates that the material is oil resistant. The numbers "15" and "25" used in connection with the trade name designate grade marks. The material "Hycar OR-25" in "Example 2" differs from "Hycar OR-15" in "Example 3" mainly in that the former contains about .005% methylene blue.

In the use of guaiac resin as a plasticizing agent in connection with rubber compounds or synthetic rubber in which latex is used, there is a tendency for precipitation or coagulation of rubber if a guaiac resin solution in alcohol is used, particularly in incorporating carbon black with the latex. It is preferable in this case to admix about 10 parts by weight of powdered guaiac resin with 75 parts by weight of water and 0.75 parts by weight of "Tamol R," which is a sodium salt of condensed alkyl naphthalene sulphonic acid, as a dispersing agent. When admixed with latex in proportions of from 1 to 10 percent by weight of guaiac resin based on the rubber content, there is little tendency to settle out and the dispersion remains fluid.

Another method of preventing coagulation of latex in the dispersion is to use 2 to 4 percent of the dispersing agent with the guaiac resin, then stirring the guaiac resin into water containing the dispersing agent and then flocculating with alum. After flocculation, the alum is neutralized with a base, such as sodium hydroxide. This flocculated guaiac resin may then be mixed with the latex or dispersion in the usual manner.

In connection with the use of and the carrying out of the invention, as above explained, it should be understood that other solvents or mixtures of solvents may be used in dissolving the guaiac resin, but a number of so-called "solvents" have little or no effect upon guaiac resin. Oil of turpentine, for example, leaves guaiac gum untouched. It is sparingly soluble in carbon bisulfide or benzene. In carrying out the invention, therefore, it should be understood that methyl ethyl ketone is the preferred solvent for guaiac resin in connection with coating sheets of synthetic rubber or in the making of laminated layers of methyl methacrylate (as Plexiglas), or polybutadienes, polyisoprene, and the various vinyl resinous compounds to which the invention may be applied, although other solvents, above set forth, are suitable for the purpose. It is to be understood that it is not necessary to dissolve guaiac resin in methyl ethyl ketone or other solvent when it is to be incorporated in synthetic rubber compounds, since the guaiac resin may be added directly to the rubber in powdered form, as above stated.

It will be understood that various changes may be made in the method above described and in the compositions produced thereby without departing from the spirit or scope of the invention hereinafter defined in the annexed claims.

Having thus described the invention, what is claimed as new is:

1. A method of forming a laminated product which comprises dissolving about 10 parts of guaiac resin in about 50 parts of methyl ethyl ketone, applying the solution over the surface of a sheet of an interpolymer of polybutadiene, allowing the sheet to dry and pressing a plurality of such sheets together to provide laminations thereof.

2. A method of forming a laminated synthetic rubber product which comprises forming a solution of guaiac resin in a solvent therefor, plasticizing polymerized 2-chloro-butadiene 1,3, by incorporating therein from 1 to 3 percent by weight of powdered guaiac resin, masticating the admixture, forming sheets of the resulting admixture, coating the said sheets with the said guaiac resin solution, pressing the sheets together and curing the product at a vulcanizing temperature.

3. A laminated synthetic rubber product comprising polymerized 2-chloro-butadiene 1,3, plasticized with from 1 to 3 percent by weight of guaiac resin in which the laminations are coated with guaiac resin prior to joining and in which the laminated product is cured.

4. A method for plasticizing plastic compositions containing material selected from the class consisting of natural rubber, chlorinated rubber, reclaimed rubber, polybutadiene, polyisoprene, copolymer of butadiene and methacrylic nitrile, copolymer of butadiene and acrylonitrile, and copolymer of butadiene and styrene to improve the working properties thereof and to produce tackiness therein prior to and during curing and setting reactions, which comprises treating the material with from 1 to 10 percent by weight of guaiac resin based on the reacting ingredients in the composition, masticating the admixture to obtain a homogeneous mass and subjecting the mass to heat and pressure sufficient to provide a setting reaction therein.

WALTER C. KLINGEL.

REFERENCES CITED

The following references are of record in the file of this patent:

UNITED STATES PATENTS

| Number | Name | Date |
|---|---|---|
| 1,642,847 | Emannele | Sept. 20, 1927 |
| 2,170,947 | Habgood et al. | Aug. 29, 1939 |
| 2,278,802 | Sarbach | Apr. 7, 1942 |
| 2,291,208 | Brown et al. | July 28, 1942 |
| 2,323,562 | Nugent | July 6, 1943 |
| 2,377,610 | Brown | June 5, 1945 |
| 2,418,025 | Garvey | Mar. 25, 1947 |

OTHER REFERENCES

Alien Property Custodian publication of application Serial No. 359,744, published May 11, 1943.